United States Patent
DeLuca

(10) Patent No.: US 9,756,607 B1
(45) Date of Patent: Sep. 5, 2017

(54) AUTOMATED NOTIFICATION MUTING RESPONSIVE TO PREDICTED LOCATION

(71) Applicant: INTERNATIONAL BUSINESS MACHINES CORPORATION, Armonk, NY (US)

(72) Inventor: Lisa Seacat DeLuca, Baltimore, MD (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/334,330

(22) Filed: Oct. 26, 2016

(51) Int. Cl.
| | |
|---|---|
| H04W 24/00 | (2009.01) |
| H04W 68/02 | (2009.01) |
| H04W 4/00 | (2009.01) |
| H04W 64/00 | (2009.01) |
| H04L 12/58 | (2006.01) |
| H04L 29/08 | (2006.01) |

(52) U.S. Cl.
CPC ............. *H04W 68/02* (2013.01); *H04L 51/24* (2013.01); *H04L 67/26* (2013.01); *H04W 4/008* (2013.01); *H04W 64/00* (2013.01)

(58) Field of Classification Search
CPC ..... H04W 68/02; H04W 4/008; H04W 64/00; H04L 67/26; H04L 51/24
USPC ............ 455/404.1, 412.1–414.2, 418–422.1, 455/456.1–456.2, 456.4–457, 41.1–41.2, 455/552.1, 556.2
See application file for complete search history.

(56) References Cited

U.S. PATENT DOCUMENTS

| | | | |
|---|---|---|---|
| 7,343,317 B2 * | 3/2008 | Jokinen ................. | G06Q 30/02 370/328 |
| 2008/0139181 A1 * | 6/2008 | Lokshin ................ | G06Q 30/02 455/414.1 |

(Continued)

FOREIGN PATENT DOCUMENTS

| | | |
|---|---|---|
| CN | 1460373 A | 12/2003 |
| WO | WO2012135155 A2 | 10/2012 |

OTHER PUBLICATIONS

Peter Mell et al, The NIST Definition of Cloud Computing, National Institute of Standards and Technology, Publication 800-145, 2011.

(Continued)

*Primary Examiner* — Babar Sarwar
(74) *Attorney, Agent, or Firm* — Patrick J. Daugherty; Driggs, Hogg, Daugherty & Del Zoppo Co., LPA

(57) ABSTRACT

In response to determining a physical presence of a person within a geographic micro-location area defined by virtual micro-location area boundaries, a computer processor determines a dwell time as an elapsed time that the person dwells within the micro-location area after determining the physical presence of the person. In response to the dwell time meeting a message trigger threshold, the computer processor determines whether the person is likely to be within the micro-location area at the end of a relevancy time period as a function of current geographic location position of the person, speed and direction of motion of the person, and distance to the micro-location area boundaries. If unlikely that the person will be within the micro-location area at the end of the relevancy time period, the processor mutes transmission to the person of a message associated with dwelling within the micro-location area for the trigger time.

20 Claims, 4 Drawing Sheets

(56) References Cited

U.S. PATENT DOCUMENTS

| | | | | |
|---|---|---|---|---|
| 2008/0248815 | A1* | 10/2008 | Busch | H04W 4/02 455/456.5 |
| 2009/0258636 | A1* | 10/2009 | Helvick | H04L 12/5895 455/414.2 |
| 2010/0161207 | A1* | 6/2010 | Do | H04W 4/02 701/532 |
| 2011/0093339 | A1 | 4/2011 | Morton | |
| 2011/0320259 | A1* | 12/2011 | Roumeliotis | G06Q 30/02 705/14.41 |
| 2012/0271715 | A1* | 10/2012 | Morton | G06Q 30/0257 705/14.53 |
| 2012/0310741 | A1* | 12/2012 | Uyeki | G06Q 30/0211 705/14.58 |
| 2013/0267253 | A1* | 10/2013 | Case | H04W 4/021 455/456.3 |
| 2014/0279015 | A1* | 9/2014 | Root | G06Q 30/0261 705/14.58 |
| 2015/0220993 | A1* | 8/2015 | Bente | G06Q 30/0267 705/14.58 |
| 2016/0034961 | A1* | 2/2016 | May | G06Q 30/0261 705/14.58 |
| 2016/0253710 | A1* | 9/2016 | Publicover | G06Q 30/02 705/14.66 |

OTHER PUBLICATIONS

Ruckus Wireless, Inc., Location: The New Battlefield for Business & Digital Innovation, www.ruckuswireless.com, 2014.

Dr. Phil Hendrix, Watch this Space—How Mobile and Beacons Are Enhancing the Value of Out-of-Home Media for Advertisers and Mobile App Partners, Gimbal, 2015.

Nielsen Norman Group, Evidence-Based User Experience Research, Training, and Consulting, 1998-2016.

* cited by examiner

AUTOMATED NOTIFICATION MUTING RESPONSIVE TO PREDICTED LOCATION

BACKGROUND

Micro-location refers to defining distinct areas, zones or regions within real-world, physical geographic areas that are subject to occupation by persons or other objects with reference to by electronic or virtual perimeters. The virtual perimeters are not visible tangible objects that physically engage or prevent ingress or egress into micro location areas, but are instead defined in space by geographic coordinates, or by distance dimensions relative to some reference point or location. Micro-locations may be configured as a predefined set of boundaries, such as at the borders of departments in a retail store, restricted areas, rooms in a building, etc.

Micro-locations can also be dynamically generated and defined by effective radio wave broadcast or distance dimension radii around an object or other reference point location, for example extending to a distance from a broadcast node at which a Bluetooth® of Wireless Fidelity ("WiFi") signal or message is receivable by a personal programmable device carried by a user. (BLUETOOTH is a trademark of Bluetooth SIG. in the United States or other countries.) As micro-location zones are not physical objects, their size and dimensions may be dynamically altered and customized as needed, providing boundaries that are variable over time with respect to establishing zoned areas. For example, a BLUETOOTH beacon uses low energy proximity sensing to transmit a universally unique identifier that, when in close proximity, is picked up by mobile programmable devices such smart phones, tablets, global positional system (GPS) devices, personal digital assistants (PDAs) and other devices, Such devices use the transmitted beacon information to perform a variety of actions, including determining the device's physical location, tracking movement of the device, and triggering location-based actions on the device (check-in on social media, triggering a location-specific push notification, etc.).

Mobile devices may use communications with micro-location systems to determine their movement relative to defined zones (time currently dwelling within a zone, movement entering or exiting different zones, etc.). Location-aware computing devices may thereby receive messages and other notifications (push text messaging, e-mail, SMS messaging, etc.) from micro-location service providers or other associated entities that provide information relevant to the device or the user associated with the device, including as related to attributes of a particular, proximate zone location.

Micro-location systems can be configured to enable an action to be taken when a device enters or leaves a specific geographical area defined by a zone. For example, service providers may use micro-locations to track user movements relative to restricted areas, and thereby generate and broadcast warning to users that they (or someone else carrying such a device) are about to leave or enter a particular restricted area. Micro-location systems may send a text notification to a user carrying a smart phone that he or she is leaving a secure area and will need to produce appropriate identification credentials in order to gain re-admittance, or an alert to a parent that an infant wearing a monitoring device is approaching an outer boundary of the back yard of a home.

Commerce and marketing services may use micro-locations to alert user's operating or carrying personal, location-aware computing devices of offers and other marketing that are relevant to a proximate zone, for example to sale promotion currently in effect at a nearby store department. Thus, an electronic shopping list application executing on a smart phone may interact with a micro-location system of a retail establishment, wherein the retailer's system may review shopping list data and notify a user to buy bread when user nears a grocery store, or a bakery department within the grocery store. A department store application may notify a user about a current sale on their favorite shirts (as indicated by their shopping history) when at or near a store branch, or within the relevant clothing department zone.

BRIEF SUMMARY

In one aspect of the present invention, a computerized method for notification muting in response to predicted location relative to a micro-location area includes executing steps on a computer processor. Thus, in response to determining a physical presence of a person within a geographic micro-location area that is defined by virtual micro-location area boundaries, a computer processor determines a dwell time as an elapsed amount of time that the person dwells within the micro-location area as bounded by the micro-location area boundaries after determining the physical presence of the person. In response to determining that the dwell time meets a message trigger threshold time, the computer processor determines whether the person is likely to be within the micro-location area at an end of a relevancy period of time elapsed after a current time as a function of a current geographic location position of the person, a speed of motion of the person, a direction of motion of the person, and a distance from the current geographic location position to the micro-location area boundaries. In response to determining that it is likely that the person will not be within the micro-location area at the end of the relevancy time period, the computer processor mutes transmission to the person of a message that is associated with dwelling within the micro-location area for the trigger time.

In another aspect, a system has a hardware processor in circuit communication with a computer readable memory and a computer-readable storage medium having program instructions stored thereon. The processor executes the program instructions stored on the computer-readable storage medium via the computer readable memory and thereby, in response to determining a physical presence of a person within a geographic micro-location area that is defined by virtual micro-location area boundaries, a computer processor determines a dwell time as an elapsed amount of time that the person dwells within the micro-location area as bounded by the micro-location area boundaries after determining the physical presence of the person. In response to determining that the dwell time meets a message trigger threshold time, the computer processor determines whether the person is likely to be within the micro-location area at an end of a relevancy period of time elapsed after a current time as a function of a current geographic location position of the person, a speed of motion of the person, a direction of motion of the person, and a distance from the current geographic location position to the micro-location area boundaries. In response to determining that it is likely that the person will not be within the micro-location area at the end of the relevancy time period, the computer processor mutes transmission to the person of a message that is associated with dwelling within the micro-location area for the trigger time.

In another aspect, a computer program product for notification muting in response to predicted location relative to a micro-location area has a computer-readable storage medium with computer readable program code embodied therewith. The computer readable hardware medium is not a transitory signal per se. The computer readable program code includes instructions for execution which cause the processor to, in response to determining a physical presence of a person within a geographic micro-location area that is defined by virtual micro-location area boundaries, determine a dwell time as an elapsed amount of time that the person dwells within the micro-location area as bounded by the micro-location area boundaries after determining the physical presence of the person. In response to determining that the dwell time meets a message trigger threshold time, the codes cause the computer processor to determine whether the person is likely to be within the micro-location area at an end of a relevancy period of time elapsed after a current time as a function of a current geographic location position of the person, a speed of motion of the person, a direction of motion of the person, and a distance from the current geographic location position to the micro-location area boundaries. In response to determining that it is likely that the person will not be within the micro-location area at the end of the relevancy time period, the codes cause the computer processor to mute transmission to the person of a message that is associated with dwelling within the micro-location area for the trigger time.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
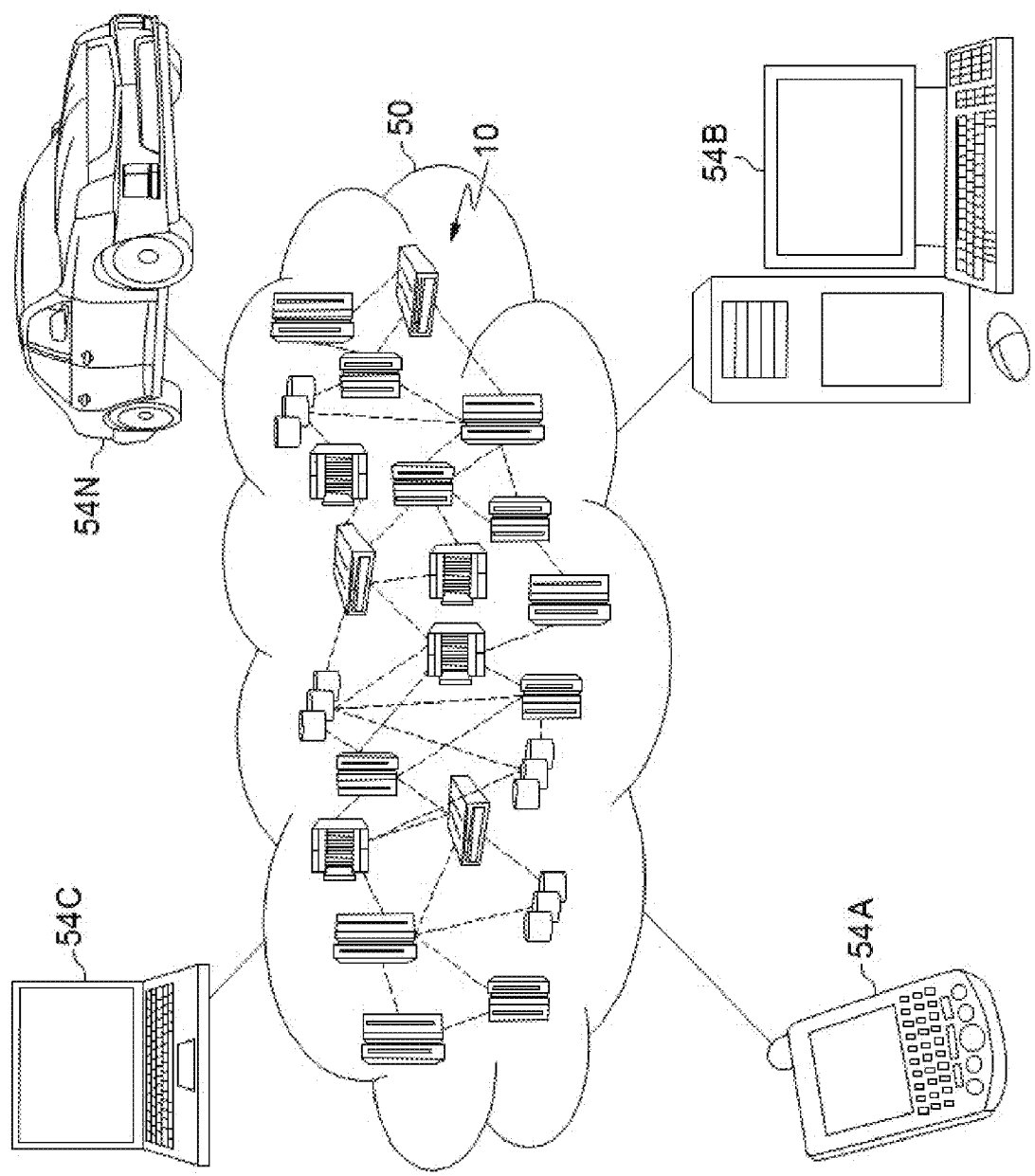
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
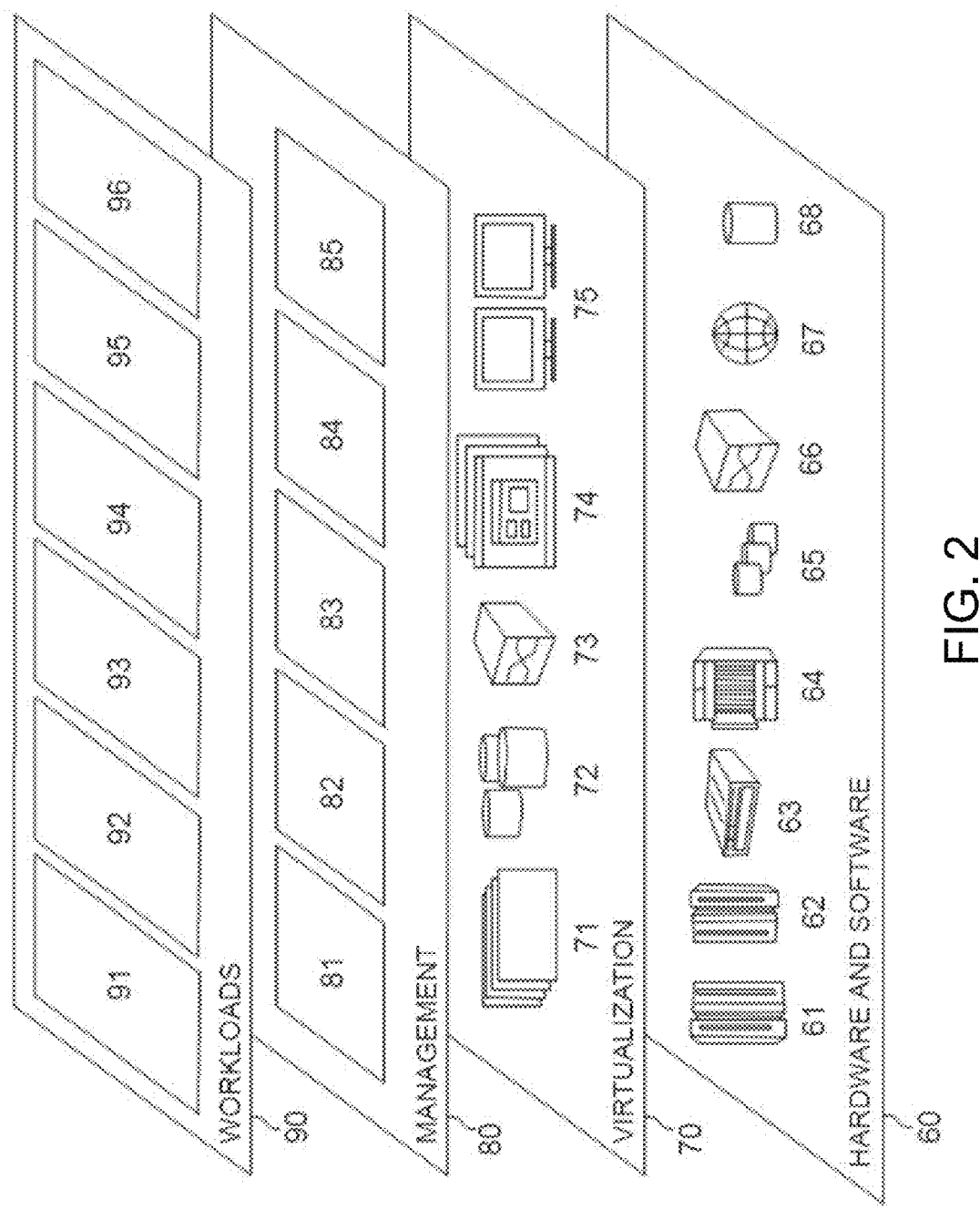
FIG. 2 depicts a cloud computing node according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Figure 4:
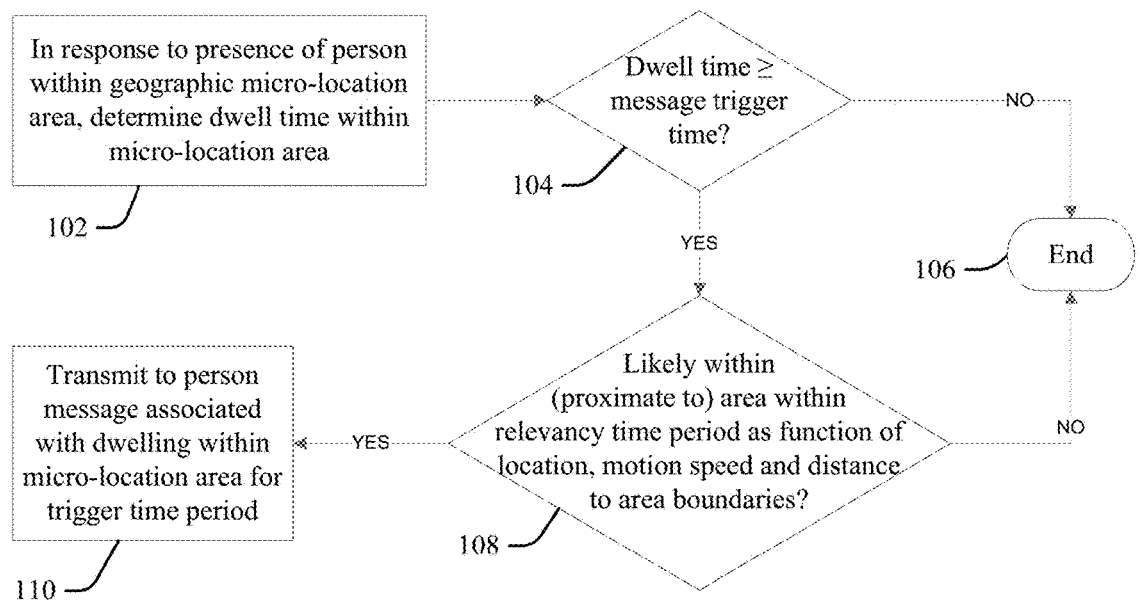
FIG. 4 is a flow chart illustration of a process or system for notification muting in response to predicted location relative to a micro-location area according to an embodiment of the present invention.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing 96 for notification muting in response to predicted location relative to a micro-location area according to embodiments, for example as depicted in FIG. 4 and described below.

Figure 3:
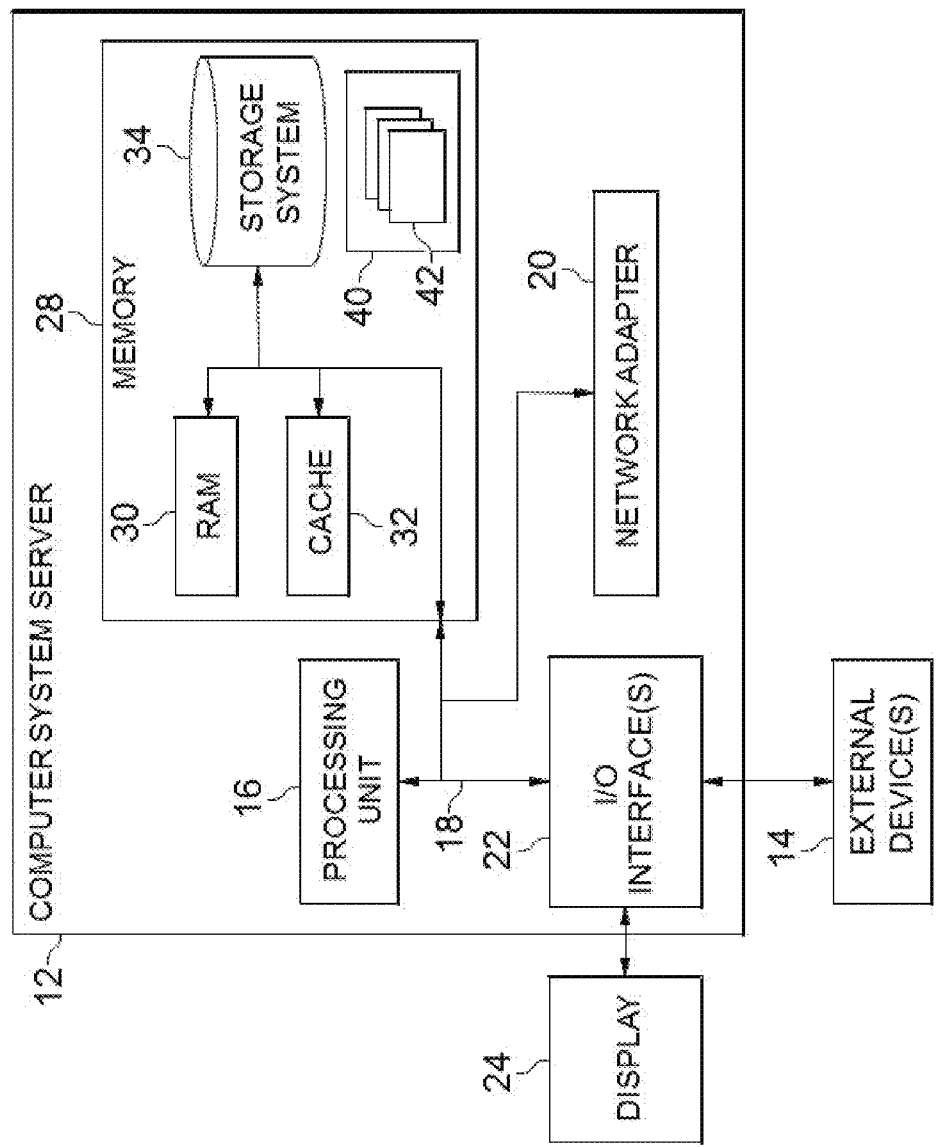
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

FIG. 4 illustrates a process or system according to the present invention for notification muting in response to predicted location relative to a micro-location area. At 102, in response to determining a physical presence of a person within a geographic micro-location area that is defined by virtual micro-location boundaries, a processor configured according to the present invention determines dwell time of the person within the micro-location area (the elapsed amount of time that the person dwells within the micro-location area as bounded by the micro-location boundaries, after the person's presence is determined).

At 104 the configured processor compares dwell time to a threshold message trigger time during the determined presence of the person within the micro-location area. If the dwell time does not meet or exceed the threshold message trigger time (for example, the person leaves the micro-location area prior to dwelling long enough to meet the threshold message trigger time), the configured processor ends the process at 106.

Else, in response to determining that the dwell time meets (or exceeds) the threshold message trigger time, at 108 the configured processor determines whether the person is likely to be within (or proximate to) the micro-location area within a relevancy period of time as a function of a current geographic location position of the person, a speed of motion of the person in moving through different geographic location positions, and a distance to the micro-location virtual perimeters or boundaries (for example, to a point on the micro-location boundaries that intersects a directional line of motion defined by the motion of the person from the current location of the person).

At 110, in response to determining that it is likely that the person will be within (or proximate) to the micro-location area for the relevancy period of time, the configured processor transmits a message associated with dwelling within the micro-location area for the trigger time to the person. Otherwise, the configured processor mutes the message (blocks transmission of the message and ends process at 106.

In conventional, prior art processes it is known for service providers to monitor micro-location areas for the presence of persons, and to select and broadcast message content to such persons as appropriate for the nature of the micro-location area. Thus, marketing service providers may broadcast a promotional message to a smart phone of the person regarding advertisement or discount offered for purchase of a product (goods or services) offered within a retail store micro-location area, such as a text or email message including a time-dependent discount coupon for a specific bread product that is offered for sale within the store, or within a particular bakery area of store.

Prior art approaches have inherent disadvantages. While location-based notifications may be beneficial to a shopper (via offering discounts for goods located nearby, etc.), there are times when such notifications are perceived instead as an annoyance or nuisance by a recipient, wherein the recipient is not currently interested in receiving and reading such notifications while passing a micro-location beacon or through a micro-location area. This occurs when the recipient shopper is in a rush and focused on another product or accomplishing some other task, and when the notification is delivered or read and comprehended after the recipient has have already left a particular micro-location area in which the notification is relevant.

Figure 5:
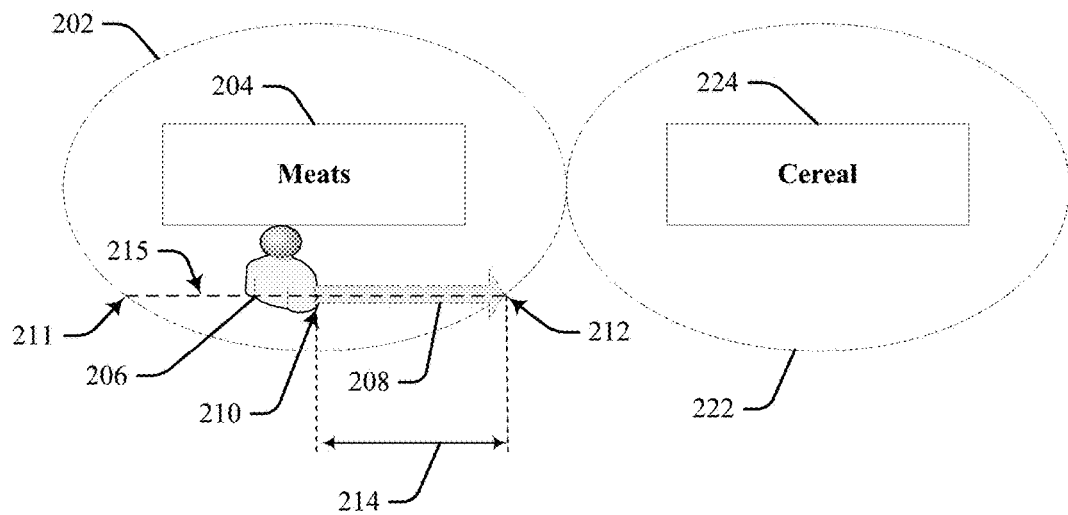
FIG. 5 is a graphic illustration of an implementation of an aspect of the present invention.

For example, consider a person ("Bob") who is shopping in a grocery store to purchase only two items appearing on a shopping list, a canned good found in a canned goods section or aisle, and a dairy item found in a dairy aisle. Bob may travel through eight different departments or products aisles or areas that are each differentiated and distinguished from each other by micro-location virtual perimeters, progressively entering and exiting each of different vegetables, fruit, canned goods, meats, cereal, baking goods, freezer items and dairy product micro-location areas or zones. FIG. 5 illustrates a portion of Bob's journey, wherein Bob 206 is shown while travelling through the meats section area 204, and thus currently within an elliptical micro-location virtual perimeter area boundary 202 of the meats section 204. Vector 208 indicates the speed and direction of motion of Bob 206 as he moves toward the cereal section 224 and it's associated elliptical micro-location virtual perimeter area boundary 222.

Under the prior art, in response to his travels through the geographic areas defined as falling within each of the different micro-location areas of the eight store sections, depending on applicable message trigger criteria (dwell time, proximity, etc.), Bob may receive eight different promotional message notifications on his or her smart phone, one for each for different products located within respective ones the eight different departments entered and exited. For example, in some prior art examples merely entering each of the eight different micro-location areas will trigger promotional messages limited to products within their associated product sections. As Bob only wishes to a purchase a canned good and a dairy item, he considers the other six messages generated with respect to the goods in the other sections (vegetables, fruit, meats, cereal, baking goods, and freezer items) to be a nuisance. He is annoyed by the inefficiencies they introduce into his shopping experience, by the time he must expend in reading and comprehending and processing (deleting) each of the irrelevant six offers. Such inefficiencies and feelings of irritation may outweigh the perceived benefit of receiving such offers in general, and Bob chooses to ignore all marketing communications from this retail service provider in the future, and deletes a mobile application configured to receive communications from this service provider from his phone. Thus, under the prior art, the use of messages targeted to micro-location area occupations, rather than encouraging the engagement of Bob with marketing efforts, results in inhibiting and discouraging opportunities for acceptance of offers, and thereby directly in loss of associated sales revenue.

In contrast, aspects of the present invention consider the speed and direction of Bob's movement in the context of current location relative to micro-location area boundaries to avoid sending unwanted messages to persons that otherwise satisfy an dwell location and time criteria with respect to a given micro-location area under the prior art. Aspects actively mute (stop or prevent) the broadcast of messages for given micro-location areas in response to determining that Bob is likely to exit the areas before he has enough time, as defined by the determined or specified relevancy period, to process and act on the message notification associated with activity within the micro-location areas.

Thus, in one example of the implementation shown in FIG. 5, Bob 206 has dwelled the elliptical micro-location virtual boundaries 202 for the meats section 204 for a message trigger time, which triggers initiation of a broadcast to Bob 206 of a promotional message for a meat item that is on sale and obtainable from the meats section 204. However, an aspect according to the present invention further determines that the speed and motion vector data 208 for the detected presence of Bob 206 indicates that he is approaching an exit point 212 on the elliptical micro-location area boundary 202, wherein he will leave the area boundary 202 upon crossing said point 212; and that at the speed of said vector data 208 Bob 206 will more than cover the distance 214 from a current determined position 210 of Bob 206 to the exit point 212, and thus that Bob will be located outside the area boundary 202 at the end of a relevancy period chosen to reflect the time Bob needs to receive and process (read, listen to, etc.) a promotional message for a meat item on sale (for example, ten seconds). Accordingly, even though Bob is located within the elliptical micro-location area boundary 202 for the requisite dwell period that would trigger sending Bob the meat item promotional message under the prior art, the message is instead muted (not transmitted to Bob), and the process for determining whether to broadcast said message ends (at 106, FIG. 4).

The relevancy period and dwell trigger times may be specified or chosen as a function of a variety of processes and determinations. For example, the relevancy period may be chosen as a minimum time indicated by historical data or research findings that a person requires to receive and process the content of the message, and thus as a function of an amount of content (number of words, length of time of audio content, number of images, etc.) and/or of a complexity of the content (with longer times allocated for more complex interrelationships of the content, or numbers of associations, determinations and comparisons required to process the content, etc.)

The relevancy period may also be specified or chosen as a function of comparing the speed of travel of the detected locations of Bob 206 to cross-sectional sizes of the different the micro-location areas 202 and 222 along the direction of Bob's 206 movement vector data 208. Aspects may thus recognize that Bob 206 is entering and exiting the zones 202 and 222 so quickly that all notifications are muted at the current speed, as Bob 206 is not likely to be within either of the area boundaries 202 and 222 at the end of applicable relevancy period boundary times. Though Bob 206 would have triggered an event to cause him to go into a marketing program campaign flow under the prior art, by comparing his speed against the cross-sectional sizes of the zones 202 and 222 a processor configured according to the present invention mutes the marketing notifications, effectively removing him from the marketing program process. If Bob 206 moves so fast that he exits the grocery store completely before any notifications could make it to his device (in effect, he flowed completely through the marketing program), he receive no messages, rather than receiving them too late, and with any associated annoyance.

Speed and direction of motion may be used to determine the relevancy period. For example, Bob's 206 speed may be below a threshold (such as a browsing speed threshold), or he may move backward and forward along the meats aisle shelves 204 during his dwell time within the associated micro-location area boundary 202, wherein each determination (or a combination of the two) indicates that Bob that is likely a type of shopper (browser, researcher, or bargain hunter) who is more likely to consider different options in purchasing a meat item, and thereby to respond to a promotional message for a meat item on sale. Accordingly, the time of the relevancy period may be reduced, or initialized to zero, in order to thereby proportionately reduce the chances that the relevancy period with result in muting the message upon the presence of Bob 206 meeting the dwell trigger time.

In contrast, if Bob's 206 speed is above a threshold indicative of non-browsing shopper (for example, a speed indicative that he is driven, focused on certain known products, or list-driven, etc.), or he moves in a straight line 215 between entry 211 and exit 212 points within the associated micro-location area boundary 202, either of said determinations (or a combination of the two) may indicates that Bob that is likely a different type of shopper (impatient, in a hurry, focused on certain known products, list-driven, etc.)) that is more unlikely to consider purchasing a promoted meat item, and thereby to not respond to the promotional message for the meat item on sale. Accordingly, the message may be muted regardless of the value of the relevancy period, or the relevancy period time may be increased in order to thereby proportionately decrease the chances that the presence of Bob 206 trigger broadcast of the message to Bob 206 (as a function of the dwell trigger time and the relevancy period time value considered at 108, FIG. 4).

In some aspects a drop in speed of motion indicates a change of shopper type determined for Bob 206. Thus, if Bob's 206 motion slows down below a browsing speed threshold during the relevancy period, thus while leaving, or immediately after leaving the region defined as within the meats section area boundary 202 and still proximate thereto, aspects may determine that Bob's 206 type of shopper has changed (revised) to a browser, researcher, or bargain hunter type, indicating that he is likely now thinking of one of the meats section 204 products that he has just walked past, that he pausing to consider one of the products, etc. Accordingly, the time of the relevancy period may be reduced, or initialized to zero, in order to thereby proportionately reduce the chances that the relevancy period with result in muting the message upon the presence of Bob 206 meeting the dwell trigger time for the meats section area 204 within the boundary 202.

Dwell or relevancy time thresholds may also be reduced in response to determining that a person has re-entered a given micro-location zone, reflecting a determination of an increase in the likelihood that the person is interested in products offered within that area (based on their decision of Bob to return to the area). Thus, if Bob's time within a given micro-location area met the dwell time threshold during a previous visit, but a processor configured according to the present invention muted the triggering of an associated message (for example, because Bob was moving too fast and would be outside the area after the relevancy period), the processor may decrease the message trigger threshold time applied for Bob's return to the area in response to determining that the physical presence of Bob is a repeat visit to the area (for example, multiple visits within the same day, or month, etc.), reflecting (is some aspects, proportionately) the determination of increased likelihood that Bob has changed his mind, is now more interested in the products offered within the area (as evidenced by his decision to return to the area). In order to avoid missing an opportunity to send a marketing offer associated with products within the area that Bob is apparently now more receptive to, the dwell time threshold is reduced (and optionally also the relevancy period) in order to get the message to Bob during his second visit to the area while he is still within the area (before his motion takes him out of the area).

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification denote the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for notification muting in response to predicted location relative to a micro-location area, comprising executing on a computer processor the steps of:

in response to determining a physical presence of a person within a geographic micro-location area that is defined by virtual micro-location area boundaries, determining a dwell time as an elapsed amount of time that the person dwells within the micro-location area as bounded by the micro-location area boundaries after determining the physical presence of the person;

in response to determining that the dwell time meets a message trigger threshold time, determining whether the person is likely to be within the micro-location area at an end of a relevancy period of time elapsed after a current time as a function of a current geographic location position of the person, a speed of motion of the person, a direction of motion of the person, and a distance from the current geographic location position to the micro-location area boundaries;

in response to determining that the dwell time meets the message trigger threshold time, determining whether the person is likely to be outside and proximate to the micro-location area at the end of the relevancy time period as a function of the current location position of the person within the micro-location area, the speed of motion of the person, and the distance to the micro-location boundaries;

in response to determining that it is likely that the person will not be within the micro-location area at the end of the relevancy time period, muting transmission to the person of a message that is associated with dwelling within the micro-location area for the trigger time; and in response to determining that the person is likely to be outside and proximate to the micro-location area at the end of the relevancy time period, transmitting the message associated with dwelling within the micro-location area for the trigger time to the person.

2. The method of claim 1, further comprising:
setting the relevancy period of time as a minimum time indicated by historical data that a person requires to receive and process content of the message associated with dwelling within the micro-location area for the trigger time.

3. The method of claim 1, further comprising
increasing the relevancy time period in response to a determination selected from the group consisting of:
determining that the speed of motion is below a browsing speed threshold;
determining that the direction of motion varies during the dwell time; and determining that the speed of motion is below the browsing speed threshold and that the direction of motion varies during the dwell time.

4. The method of claim 1, further comprising:
decreasing the relevancy time period in response to a determination selected from the group consisting of:
determining that the speed of motion is above a non-browsing speed threshold;
determining that the direction of motion is a straight line between entry and exit points of the micro-location area boundaries during the dwell time; and
determining that the speed of motion is above the non-browsing speed threshold and that that the direction of motion is the straight line between the entry and exit points of the micro-location area boundaries during the dwell time.

5. The method of claim 1, further comprising:
decreasing the message trigger threshold time in response to determining that the physical presence of the person within the geographic micro-location area is subsequent in time to a previous presence of the person within the geographic micro-location area for a previous dwell time that met the message trigger threshold time, and that a transmission of the message associated with dwelling within the micro-location area for the trigger time was muted in response to determining that it was not likely that the previous presence of the person would continue within the micro-location area until an end of a relevancy time period applicable to the previous presence of the person within the geographic micro-location area for the previous dwell time.

6. The method of claim 1, wherein the step of determining whether the person is likely to be outside and proximate to the micro-location area during the relevancy period of time is further in response to determining a drop in the speed of motion below a browsing speed threshold during the relevancy period.

7. The method of claim 1, further comprising:
integrating computer-readable program code into a computer system comprising a processor, a computer readable memory in circuit communication with the processor, and a computer readable storage medium in circuit communication with the processor; and
wherein the processor executes program code instructions stored on the computer-readable storage medium via the computer readable memory and thereby performs the steps of determining the dwell time in response to determining the physical presence of the person within the micro-location area defined by the virtual micro-location area boundaries, determining whether the person is likely to be within the micro-location area at the end of the relevancy period after the current time in response to determining that the dwell time meets the message trigger threshold time, determining whether the person is likely to be outside and proximate to the micro-location area at the end of the relevancy time period in response to determining that the dwell time meets the message trigger threshold time, muting the transmission of the message in response to determining that it is likely that the person will not be within the micro-location area at the end of the relevancy time period, and transmitting the message associated with dwelling within the micro-location area for the trigger time to the person in response to determining that the person is likely to be outside and proximate to the micro-location area at the end of the relevancy time period.

8. The method of claim 7, wherein the computer-readable program code is provided as a service in a cloud environment.

9. A system, comprising:
a processor;
a computer readable memory in circuit communication with the processor; and
a computer readable storage medium in circuit communication with the processor;
wherein the processor executes program instructions stored on the computer-readable storage medium via the computer readable memory and thereby:
in response to determining a physical presence of a person within a geographic micro-location area that is defined by virtual micro-location area boundaries, determines a dwell time as an elapsed amount of time that the person dwells within the micro-location area as bounded by the micro-location area boundaries after determining the physical presence of the person;
in response to determining that the dwell time meets a message trigger threshold time, determines whether the person is likely to be within the micro-location area at an end of a relevancy period of time elapsed after a current time as a function of a current geographic location position of the person, a speed of motion of the person, a direction of motion of the person, and a distance from the current geographic location position to the micro-location area boundaries;
in response to determining that the dwell time meets the message trigger threshold time, determining whether the person is likely to be outside and proximate to the micro-location area at the end of the relevancy time period as a function of the current location position of the person within the micro-location area, the speed of motion of the person, and the distance to the micro-location boundaries;
in response to determining that it is likely that the person will not be within the micro-location area at the end of the relevancy time period, mutes transmission to the person of a message that is associated with dwelling within the micro-location area for the trigger time; and
in response to determining that the person is likely to be outside and proximate to the micro-location area at the end of the relevancy time period, transmitting the message associated with dwelling within the micro-location area for the trigger time to the person.

10. The system of claim 9, wherein the processor executes the program instructions stored on the computer-readable storage medium via the computer readable memory and thereby further:
sets the relevancy time period as a minimum time indicated by historical data that a person requires to receive and process content of the message associated with dwelling within the micro-location area for the trigger time.

11. The system of claim 9, wherein the processor executes the program instructions stored on the computer-readable storage medium via the computer readable memory and thereby further:
increases the relevancy time period in response to a determination selected from the group consisting of:
determining that the speed of motion is below a browsing speed threshold;
determining that the direction of motion varies during the dwell time; and determining that the speed of motion is below the browsing speed threshold and that the direction of motion varies during the dwell time.

12. The system of claim 9, wherein the processor executes the program instructions stored on the computer-readable storage medium via the computer readable memory and thereby further:
   decreases the relevancy time period in response to a determination selected from the group consisting of:
   determining that the speed of motion is above a non-browsing speed threshold;
   determining that the direction of motion is a straight line between entry and exit points of the micro-location area boundaries during the dwell time; and
   determining that the speed of motion is above the non-browsing speed threshold and that that the direction of motion is the straight line between the entry and exit points of the micro-location area boundaries during the dwell time.

13. The system of claim 9, wherein the processor executes the program instructions stored on the computer-readable storage medium via the computer readable memory and thereby further:
   decreases the message trigger threshold time in response to determining that the physical presence of the person within the geographic micro-location area is subsequent in time to a previous presence of the person within the geographic micro-location area for a previous dwell time that met the message trigger threshold time, and that a transmission of the message associated with dwelling within the micro-location area for the trigger time was muted in response to determining that it was not likely that the previous presence of the person would continue within the micro-location area until an end of a relevancy time period applicable to the previous presence of the person within the geographic micro-location area for the previous dwell time.

14. The system of claim 9, wherein the processor executes the program instructions stored on the computer-readable storage medium via the computer readable memory and thereby further:
   determines whether the person is likely to be outside and proximate to the micro-location area at the end of the relevancy time period in response to determining a drop in the speed of motion below a browsing speed threshold during the relevancy period.

15. A computer program product for notification muting in response to predicted location relative to a micro-location area, the computer program product comprising:
   a computer readable storage medium having computer readable program code embodied therewith, wherein the computer readable storage medium is not a transitory signal per se, the computer readable program code comprising instructions for execution by a processor that cause the processor to:
   in response to determining a physical presence of a person within a geographic micro-location area that is defined by virtual micro-location area boundaries, determine a dwell time as an elapsed amount of time that the person dwells within the micro-location area as bounded by the micro-location area boundaries after determining the physical presence of the person;
   in response to determining that the dwell time meets a message trigger threshold time, determine whether the person is likely to be within the micro-location area at an end of a relevancy period of time elapsed after a current time as a function of a current geographic location position of the person, a speed of motion of the person, a direction of motion of the person, and a distance from the current geographic location position to the micro-location area boundaries;
   in response to determining that the dwell time meets the message trigger threshold time, determining whether the person is likely to be outside and proximate to the micro-location area at the end of the relevancy time period as a function of the current location position of the person within the micro-location area, the speed of motion of the person, and the distance to the micro-location boundaries;
   in response to determining that it is likely that the person will not be within the micro-location area at the end of the relevancy time period, mute transmission to the person of a message that is associated with dwelling within the micro-location area for the trigger time;
   in response to determining that the person is likely to be outside and proximate to the micro-location area at the end of the relevancy time period, transmitting the message associated with dwelling within the micro-location area for the trigger time to the person.

16. The computer program product of claim 15, wherein the computer readable program code instructions for execution by the processor further cause the processor to increase the relevancy time period in response to a determination selected from the group consisting of:
   determining that the speed of motion is below a browsing speed threshold;
   determining that the direction of motion varies during the dwell time; and
   determining that the speed of motion is below the browsing speed threshold and that the direction of motion varies during the dwell time.

17. The computer program product of claim 15, wherein the computer readable program code instructions for execution by the processor further cause the processor to decrease the relevancy time period in response to a determination selected from the group consisting of:
   determining that the speed of motion is above a non-browsing speed threshold;
   determining that the direction of motion is a straight line between entry and exit points of the micro-location area boundaries during the dwell time; and
   determining that the speed of motion is above the non-browsing speed threshold and that that the direction of motion is the straight line between the entry and exit points of the micro-location area boundaries during the dwell time.

18. The computer program product of claim 15, wherein the computer readable program code instructions for execution by the processor further cause the processor to decrease the message trigger threshold time in response to determining that the physical presence of the person within the geographic micro-location area is subsequent in time to a previous presence of the person within the geographic micro-location area for a previous dwell time that met the message trigger threshold time, and that a transmission of the message associated with dwelling within the micro-location area for the trigger time was muted in response to determining that it was not likely that the previous presence of the person would continue within the micro-location area until an end of a relevancy time period applicable to the previous presence of the person within the geographic micro-location area for the previous dwell time.

19. The computer program product of claim 15, wherein the computer readable program code instructions for execution by the processor further cause the processor to set the relevancy period of time as a minimum time indicated by historical data that a person requires to receive and process content of the message associated with dwelling within the micro-location area for the trigger time.

20. The computer program product of claim 15, wherein the computer readable program code instructions for execution by the processor further cause the processor to determine whether the person is likely to be outside and proximate to the micro-location area during the relevancy period of time in response to determining a drop in the speed of motion below a browsing speed threshold during the relevancy period.

* * * * *